(12) United States Patent
Littlejohn

(10) Patent No.: US 6,553,353 B1
(45) Date of Patent: Apr. 22, 2003

(54) ADVANCED METERING SYSTEM ENABLING REGULATION AND BILLING OF UTILITIES BY THIRD PARTY INTERAGENT

(76) Inventor: John Joseph Littlejohn, 6556 Camino del Teatro, San Diego, CA (US) 92037

( * ) Notice: Subject to any disclaimer, the term of this patent is extended or adjusted under 35 U.S.C. 154(b) by 0 days.

(21) Appl. No.: 09/493,600

(22) Filed: Jan. 28, 2000

(51) Int. Cl.[7] .............................................. G06F 17/60
(52) U.S. Cl. ........................ 705/412; 705/400; 705/413
(58) Field of Search .................................. 324/115, 116, 324/142; 340/870.01; 700/291; 702/61, 62, 60; 705/39, 40, 41, 400, 412, 413

(56) References Cited

U.S. PATENT DOCUMENTS

| | | | |
|---|---|---|---|
| 3,778,367 A | 12/1973 | Arita ........................... | 307/140 |
| 4,240,030 A | 12/1980 | Bateman et al. ............ | 324/110 |
| 4,731,575 A | 3/1988 | Sloan ........................... | 324/113 |
| 4,777,354 A | 10/1988 | Thomas ....................... | 235/380 |
| 4,795,892 A | 1/1989 | Gilmore et al. ............. | 235/381 |
| 4,803,632 A * | 2/1989 | Frew et al. .................. | 705/412 |
| 4,908,769 A | 3/1990 | Vaughan et al. ........ | 364/464.04 |
| 5,146,067 A | 9/1992 | Sloan et al. ................. | 235/381 |
| 5,485,628 A | 1/1996 | Clements .................... | 395/800 |
| 5,959,549 A * | 9/1999 | Synesiou et al. ...... | 340/870.02 |

FOREIGN PATENT DOCUMENTS

| | | | | | |
|---|---|---|---|---|---|
| GB | 2 096 370 A | 2/1979 | | | |
| JP | 03-21872 | * | 1/1991 | ................. | 324/142 |
| JP | 11-241937 | * | 9/1999 | | |
| WO | WO 2001 55987 | * | 8/2001 | | |

OTHER PUBLICATIONS

Financial Times, London Edition: "National News: Poorest consumers of power and water 'must be helped': Poverty"; Mar. 6, 1998, 1 ED, p. 8.*

* cited by examiner

Primary Examiner—Edward R. Cosimano

(57) ABSTRACT

A power metering apparatus provides utility services to a customer's facility when the customer prepays or makes other sufficient advance payment assurances. This apparatus is inserted between the utility company's delivery lines and the customer's facility. A utility service interagent establishes an account with a utility supplier for the provision of utility services to the customer's facility, with responsibility for payment and/or provision of utility services lying with the power interagent. When the customer desires utility services, the customer. submits prepayment by various means, such as (1) purchasing a payment card and locally presenting the card to the metering apparatus, or (2) providing prepayment or other payment assurances to the interagent via telephone, cable, internet, or another means, in which case the interagent sends machine-readable payment notification to the metering apparatus via telephone, cable connection, etc. Ultimately, the metering apparatus selectively enables the delivery of utility services to the customer's facility depending upon whether the customer has made adequate prepayments.

22 Claims, 6 Drawing Sheets

ADVANCED METERING SYSTEM ENABLING REGULATION AND BILLING OF UTILITIES BY THIRD PARTY INTERAGENT

BACKGROUND OF THE INVENTION

1 Field of the Invention

The present invention relates to the provision and billing of utility services to customers' residential and commercial facilities. More particularly, the invention concerns a system for providing utility services such as electrical power, and billing them to customers independent of the normal utility provider.

2. Description of the Related Art

Electrical power is produced by a variety of different means today. In addition to nuclear and hydroelectric generators, many power plants employ boilers and steam turbine generators powered by hydrocarbons such as natural gas, oil, and the like. Power plants are operated by electricity generation companies, also known as "electricity service providers." This raw electrical power is commonly processed by transformers to increase its voltage, for transmission purposes. Then, an "electric power transmission company" transmits the electricity over various long distances using large power distribution circuits supported by appropriate towers, poles, and other suspension means. This process is commonly called "wheeling." Electricity ultimately passes to a switchyard, which in turn passes the electricity to a local substation. At the substation, and then at local transformers near where electricity will be used, the electricity is lowered to a safe voltage for homes and businesses, such as two-hundred-twenty volts and one-hundred-ten volts and then delivered to the customer. Regardless of which electricity service provider originally generated the power, electricity flows from the substation to the customer under control of an "electricity distribution company" who typically owns the local power lines and distribution equipment.

At a customer's premises, there is an electricity meter, which measures power utilization in appropriate units such as kilowatts. The meter is interposed between transmission lines emanating from the local substation's distribution transformer and a circuit "breaker box" where electricity first enters the customer's premises. Field employees of the electricity distribution company periodically read the local meters, which measure power in suitable units such as kilowatt-hours. Ultimately, these readings are used to generate the customers' electricity bills.

The foregoing arrangement has been used successfully for some time, and enjoys considerable, widespread success. Accordingly, this power distribution scheme is likely to continue for years to come. Nonetheless, the present inventor has reassessed this arrangement with an eye toward uncovering any limitations and making appropriate improvements. In this respect, the present inventor has recognized that this arrangement may not be particularly well suited to certain users, such as residential customers of lower incomes, for the following reasons. First, a customer with weak credit references might have difficulty initially establishing an account with the electricity distribution company. Furthermore, it may be difficult or even impossible for the customer to establish an account if the customer has previously had power turned off due to nonpayment.

For customers without electrical power, there may be numerous undesirable, unsafe, or even dangerous results, such as the unavailability of heat during cold winter months, inability to properly refrigerate perishable foods, and lack of lighting sufficient to prevent crime and navigate through dark households. If the customer can ultimately overcome the financial hurdles, there is the additional potential inconvenience of having to wait several days for a field employee of the electricity distribution company to arrive at the customer's residence and turn on the power. Consequently, due to the previously discussed situations along with other unsolved problems, the known arrangement for providing and billing for electrical power is not completely adequate for all customers.

SUMMARY OF THE INVENTION

Broadly, the present invention concerns a power metering apparatus with an activation feature that selectively provides power to a residential or commercial electrical facility depending upon whether the customer has made prepayment or other sufficient arrangements to purchase electricity. The power metering apparatus is inserted between an electricity distribution company's meter and a suitable location of customer's electric system, such as the breaker box. An intermediate entity, called a "power interagent" or "utility interagent," makes appropriate financial and other arrangements for continued delivery of electrical power from the electricity distribution company to the customer. This may involve, for example, establishing an ongoing account with the electricity generation, transmission, and/or distribution companies for the provision of electricity to the customer's electrical facilities, where the power interagent is responsible for payment. Whenever the customer wishes to have electric power available, the customer submits prepayments or other suitable payment assurances to the power interagent. Prepayments may be made by various means, such as (1) purchasing a magnetic, optical, or "smart" circuit card and locally presenting the card to the power metering apparatus, or (2) providing advance payment or payment assurances to the power interagent via telephone, internet, physical mail (such as U.S. Postal Service, express delivery, courier, etc.), personal delivery, e-mail, or another suitable means. Whereupon the power interagent sends machine-readable notification of the prepayment to the metering apparatus via telephone modem, digital subscriber line ("DSL") modem, cable modem, wireless, or other conveyance means. Ultimately, the power metering apparatus activates or deactivates depending upon whether the customer has made sufficient prepayments. Although the invention contemplates customers' advance payment for power, the power interagent may accept other advance guaranty or payment arrangements that are herein referred to as "prepayment." The metering apparatus may also initiate communications to the power interagent to report power usage statistics to the power interagent.

In addition to electrical power, the present invention may also be implemented in the context of other services, such as natural gas, water, telephone, cable television, etc. However, for ease of discussion, the example of electrical power is used throughout the present description as a brief example.

In one embodiment, the invention may be implemented to provide a method to operate a prepaid power metering system, or a method of doing business by providing electrical power to customers on a prepaid basis. In another embodiment, the invention may be implemented to provide a prepaid power metering system or similar apparatus. In yet another embodiment, the invention may be implemented to provide a signal-bearing medium tangibly embodying a program of machine-readable instructions executable by a digital data processing apparatus to operate a prepaid power metering apparatus. Another embodiment concerns logic circuitry having multiple interconnected electrically conductive elements configured to operate a prepaid power metering apparatus.

The invention affords its users a number of distinct advantages. With this invention, for example, customers can quickly obtain electrical power for their houses. Customers need not wait for the electricity distribution company to activate an account and dispatch a field employee to the customer's premises to start power. This invention utilizes remotely controllable equipment to selectively enable or disable electrical power, where this equipment is installed at the customer's house. Thus, the power interagent can immediately enable power whenever the customer makes an appropriate prepayment for electrical power. Thus interrupted service may be restored promptly upon payment. The invention affords customers with a number of convenient ways to make prepayment to the power interagent. The customer can authorize debits to a credit card or bank account over the telephone, submit credit card payment or bank debit authorization via e-mail or internet web site operated by the power interagent, submit funds by wire transfer, or submit a check or credit card payment by physical mail (such as U.S. Postal Service, express delivery, courier, etc.), personal delivery, or another means. According to another prepayment technique, the customer can purchase a convenient-card containing a fixed amount of "e-kilowatt-hours" or "e-funds."

Another advantage of this invention is that it enables customers with low income or poor credit histories to easily obtain electrical power. To the power metering apparatus of this invention, a customer's credit history or income is irrelevant so long as the customer makes sufficient payment arrangements, such as paying for electrical power in advance. As still another advantage, the customer may enjoy cost savings obtained by the power interagent's wheeling of power.

From the perspective of the power interagent, a number of benefits exist as well. For example, customer payments are made by suitably reliable means such as bank account debit, credit cards, and prepayment, thereby avoiding potential losses by uncollected accounts receivable. Furthermore, the power interagent may negotiate low rates on purchases from power suppliers with substantial spreads between purchase and sales prices, thereby increasing profit. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Overall Structure

Figure 1:
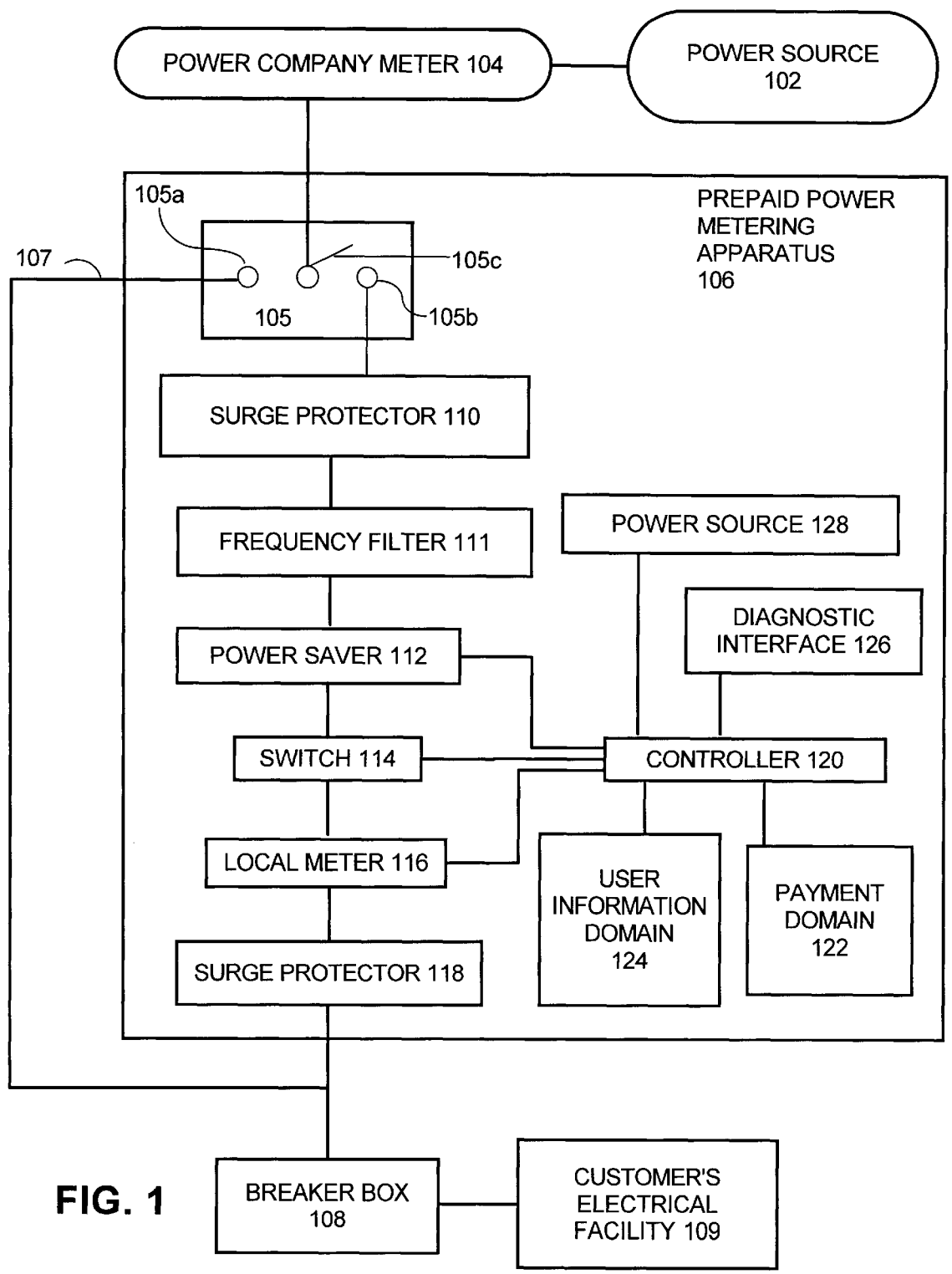
FIG. 1 is a block diagram of the overall hardware components and interconnections of a prepaid power metering system according to the invention.

One aspect of the invention concerns a prepaid power metering apparatus, which may be embodied by various hardware components and interconnections. FIG. 1 shows one exemplary construction, in the form of the prepaid power metering apparatus 106. As discussed more particularly below, the apparatus 106 is embodied by various circuitry and other hardware that measures and selectively dispenses electrical power to a customer's residential building, commercial building, remote electrical site (such as an antenna, oil pump jack, etc.), or other "electrical facility" 109 requiring electrical power. The apparatus 106 derives electrical power from a power source 102 such as transmission lines of an electricity distribution company. Accordingly, the apparatus 106 is electrically interposed between the electricity distribution company's facilities and the customer's property.

As a more particular example, as shown in FIG. 1, the apparatus 106 may be attached between the following components: (1) a circuit breaker box 108 or other inlet to the customer's electrical facility 109, and (2) the electricity distribution company's meter 104. (The meter 104, as an example, may comprise a watt-hour meter used to measure electric power in kilowatt hours. Although the present description is made in terms of electrical power, ordinarily skilled artisans, having the benefit of this disclosure, will recognize that this disclosure also applies to other utility services such as natural gas, water, telephone, cable television, and the like, whether measured in terms of time, consumption volume, or another property. In the case of utility services without a utility meter (such as telephone), the apparatus 106 may be inserted at a convenient and appropriate location between the customer's facility and the utility company's delivery lines, such as electrical lines, copper cable television line, water pipes, telephone lines, etc.

The apparatus 106 conveys electricity from the'source 102 to the customer via a power path that; as illustrated, includes a mode switch 105, input surge protector 110, frequency filter 111, power saver 112, switch 114, local meter 116, and output surge protector 118. The switch 114 operates under direction of the controller 120 according to various input received from a payment domain 122 and user information domain 124.

Mode Switch

If desired to provide additional flexibility in use, the apparatus 106 may optionally include an externally selectable mode switch 105. The mode switch 105 includes three settings, including (1) "off," where the switch 105 prevents power source 102 electricity from flowing to the breaker box 108, (2) "shunt" or "flow through," where the switch 105 conducts electricity along a path 107 directly to the breaker box 108, circumventing the prepaid power metering apparatus 106, and (3) "metering enabled," where the mode switch 105 directs electricity through the power metering apparatus 106. Although the mode switch may be implemented in many different ways, FIG. 1 illustrates one example. The illustrated mode switch 105 connects an arm 105c to a first node 105a to implement the "shunt" setting, or alternatively connects the arm 105c to a second node 105b to implement the "metering enabled" setting. When the arm 105c is not connected to either node 105a–105b, it occupies an intermediate- no-connect setting to implement the "off" setting.

The mode switch 105 provides added flexibility in operating the prepaid power metering apparatus 106. As an example, line employees of the electricity distribution company may manually activate the switch 105 by using a specially shaped key, swiping a magnetic security card, entering a PIN code on a keypad, remotely transmitting an activation signal, etc. Thus, the electricity distribution company line employees configure the switch 105 as follows:

1. The switch is placed in the "metering enabled" mode when the power interagent has arranged for power delivery, as explained below.
2. The switch is placed in the "shunt" mode when the customer has arranged for power delivery, electing not to use the power interagent's services.
3. The switch is placed in the "off" setting when the power interagent. The customer fails to pay for electrical power.

Power Path

As mentioned above, the apparatus 106 conveys electricity from the source 102 to the customer via the mode switch 105, input surge protector 110, frequency filter 111, power saver 112, switch 114, local meter 116, and output surge protector 118. The (optional) input surge protector 110 comprises a varistor, active surge protection circuitry, electromagnetic surge device, spark gap device, or other component(s) to prevent damage to the apparatus 106 from transient voltage and/or currents supplied by the power source 102, and also to prevent unwanted signals from being fed back to the power source 102. The (optional) frequency filter 111 removes any communication frequency generated by the telecommunication interface 204 from entering the power source 102. The (optional) power saver 112 comprises, singularly or in tandem, one or more of the following: a suitable chopper, switching device, shunt, time domain device, frequency altering device, or other circuitry to condition the input electric power for more efficient and cost-saving use by the customer.

Under direction of the controller 120, the switch 114 is operable to selectively enable or disable power conveyance to the customer, depending upon whether the switch is "on" or "off." As an example, the switch 114 may comprise a MOSFET, Triac, SCR, Diac, or another suitable component to selectively pass or block electrical power on the order of 20 to 200 amps and 120 volts or multiples thereof, such as 220, 440, 660 volts, etc. The local meter 116 tracks electric power delivered through the apparatus 106. Although the local meter 116 may be implemented in various ways, some examples include a solid state RMS power measurement device, digital signal processor based computation device, etc. Some suitable products are commercially sold by companies such as Schlumberger, General Electrics, Johnson Controls, Siemens, and the like. The local meter 116 is coupled to the controller 120, enabling the controller 120 to monitor current power usage by the customer's electrical facility 109, and also to track the customer's usage history.

The (optional) output surge protector 118 may employ similar components as the input surge protector 110. In contrast to the input surge protector 110, the output surge protector 118 protects the customer's electrical facilities 109, from transient voltages and/or currents that may arise from components of the apparatus 106, such as the switch 114 or power saver 112, while also protecting the apparatus 106 from activity occurring in the electrical facilities 109.

Controller

As mentioned previously, the switch 114 is operated under direction of the controller 120. In this respect, the controller 120 may comprise a microprocessor or other data processing apparatus, logic circuit, configuration of discrete circuit elements, or other electrical component capable of supplying electrical signals to activate and deactivate the switch 114. As a specific example, the controller 120 may be implemented by a Z8 microcontroller. The controller 120 may optionally be coupled to a power storage device 128 such as a battery, capacitor, and the like, to provide backup power to the controller 120 in case a wall outlet or other primary supply (not shown) of power for the apparatus 106 is disrupted. The controller 120 may also include a real-time clock (not shown) to track the date and time of day. This clock may be implemented by hardware, software, or a combination of both.

The controller 120 is coupled to a diagnostic interface 126, which is operable by a technician for the purpose of diagnosing and rectifying any operational problems with the apparatus 106. Additionally, the interface 126 may be used to reprogram the controller 120 to implement upgrades, improvements, or other software changes. The diagnostic interface 126 includes one or more of the following interface components: LCD or other visual display panel, keypad, array of light-emitting diodes, assembly of switches, serial or parallel port, electric coupling, amplifier, etc.

In addition to the diagnostic interface 126, the controller 120 is attached to a payment domain 122 and a user information domain 124. Broadly, the payment domain 122 receives notification that the user has prepaid for electricity, and also specifies the amount of the prepurchase. The user information domain 124 presents various information to the customer about the customer's power usage. The domains 122, 124 are described below in greater detail.

Payment Domain

Figure 2:
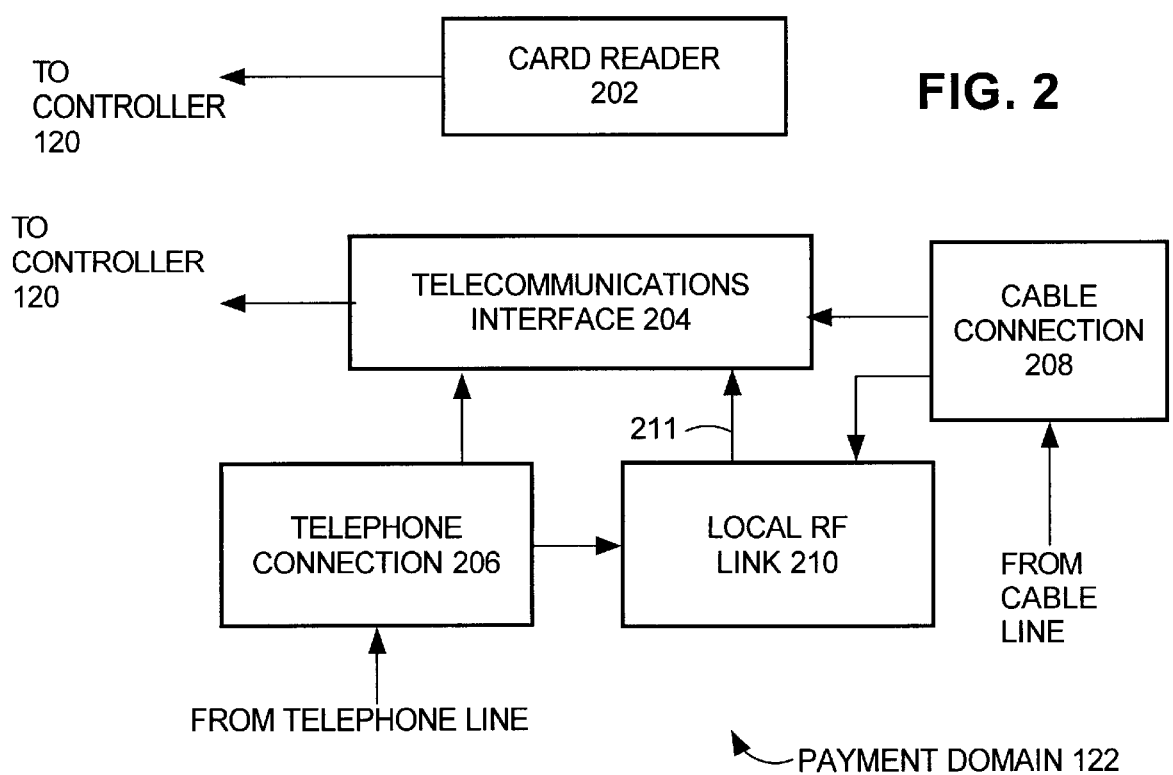
FIG. 2 is a block diagram of the hardware components and interconnections of an exemplary payment domain according to the invention.

FIG. 2 shows one exemplary implementation of the payment domain 122 in greater detail. The payment domain 122 includes a card reader 202 to receive prepayment notification directly from the customer. As a specific example, the card reader 202 may comprise a magnetic card reader that is operated by the customer presenting a magnetic card to the reader. Such presentation may be achieved by swiping the card through a card-reading channel, waving the card past a magnetic panel, inserting the card into an ATM-style slot that grasps and withdraws the card into card reading hardware, etc. Although magnetic means are discussed as one example, the card may bear data in other forms, such as measured electrical resistance or impedance, semiconductor memory (e.g., ROM, EPROM, or EEPROM), "smart" card with on-board electronics, optical storage (e.g., holographic, digital optical, etc.), paper "punch" cards, or other suitable data storage means. The card reader 202 translates the machine-readable data carried by the card into digital electrical data signals or other format compatible with the controller 120.

In addition to the card reader 202, which receives prepayment notification directly from the customer, the payment domain 122 includes a telecommunications interface 204 to receive machine-readable notification of the customer's prepayment from the power interagent. As illustrated, the interface 204 may receives this notification directly from a telephone line (via telephone connection 206), directly from a cable line (via cable connection 208), or indirectly from the telephone line or cable line via a local RF link 210. In this example, the telephone line comprises a voice telephone line, which may be provided by a local telephone company. The cable line comprises a coaxial copper cable television line, which may be provided by a cable television company. Prepayment notification may arrive at the interface 204 through other means if desired, such as RF or other completely wireless transmission.

The local RF link 210 comprises a radio frequency ("RF") link between the telephone line and/or cable line and the telecommunications interface 204, giving the customer considerable flexibility is positioning the apparatus 106, regardless of the positions of telephone and/or cable wall outlets. Although the RF bandwidth is given as one example, the link 210 may utilize sonic, ultrasonic, infrared, or other frequencies without departing from the scope of this invention. The link 210 includes a transmitter/receiver pair (not separately shown). The transmitter, placed at the wall outlet, converts signals from the telephone line and/or cable line into a suitable RF format and transmits the resultant signals to the receiver, which translates these RF signals into digital electrical signals or another format compatible with the interface 204. Transmission by the link 210 occurs through a medium 211, which may assume various forms. As one example, the transmission medium 211 may be the air, in the case of wireless transmission. As another example, the transmission medium 211 may comprise household electrical wiring, in which event the link's transmitter and receiver are both coupled to different household wall outlets. As one example, the local RF link 210 may utilize spread spectrum, electromagnetic signals. Even though the link's transmission may be introduced into the household electrical wiring, the frequency filter 111 prevents these signals from entering the power source 102 and possibly traveling to other electrical customers.

The interface 204 includes appropriate circuitry to convert machine-readable signals received from the telephone connection 206, link 210, and cable connection 208 into digital electrical data signals or other suitable format for use by the controller 120. In the case of the telephone line, for example, the interface 204 may comprise a telephone modem. Likewise, for use with the cable line, the interface 204 may comprise a cable modem.

Although not shown, other input sources may also be used, such as a T1 connection, ISDN line, digital or analog cellular link, fiber optics, digital subscriber line ("DSL"), wireless radio, satellite link, etc. In each case, the telecommunications interface 204 comprises circuitry appropriate to the input source's particular spectrum and signal format.

In addition to the input function described previously, the components of the payment domain may also transmit information from the controller 120 to remotely located sites, as discussed in greater detail below.

User Information Domain

Figure 3:
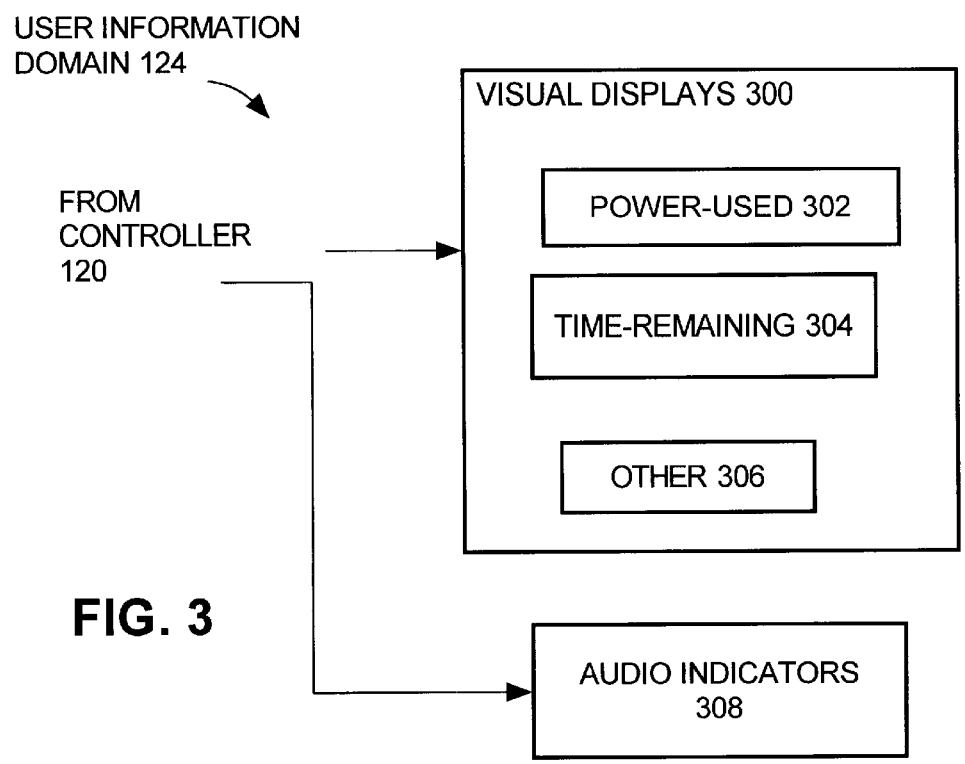
FIG. 3 is a block diagram of the hardware components and interconnections of a user information domain according to the invention.

FIG. 3 shows the user information domain 124 in greater detail. The user information domain 124 includes various devices that present power usage statistics to the customer. These statistics are computed by the controller 120, as discussed in greater detail below. As illustrated, the user information domain devices include various visual displays 300 and audio indicators 308.

The visual displays may utilize a variety of different technologies, such as light emitting diodes (LEDs), liquid crystal displays (LCDs), cathode ray tubes (CRTs), mechanically operated displays, etc. The visual displays 300 include a "power-used" component 302, showing the amount of power that the customer has used. This amount may be shown in Watts or kilowatt-hours, for example. The displays 300 also include a "time-remaining" component 304, showing the amount of time remaining before the customer exhausts the remaining prepaid power (at the current, average rate of power usage by the customer's electrical facility 109). The displays 300 may also include other components 306 to show additional information about prepayment and power usage.

The audio indicators 308 provide audible notification of certain events, such as those that would assist the customer to avoid power outage. For instance, the audio indicators may sound an alarm at certain prescribed times before power outage, such as twenty-four hours, twelve hours, six hours, three hours, one hour, and zero hours. To provide some examples, the audio indicators 308 may comprise electrically activated beepers, bells, horns, speakers, whistles, or other noise makers. The audio indicators 308 may include one or more loudspeakers to generate a different sounds having greater variety or user friendliness, such as music, human voices, etc. The audio indicators, 308 may be located with the other circuitry of the apparatus 106, or placed in remote locations that are especially likely to be heard by the customer.

Exemplary Digital Data Processing Apparatus

Figure 4A:
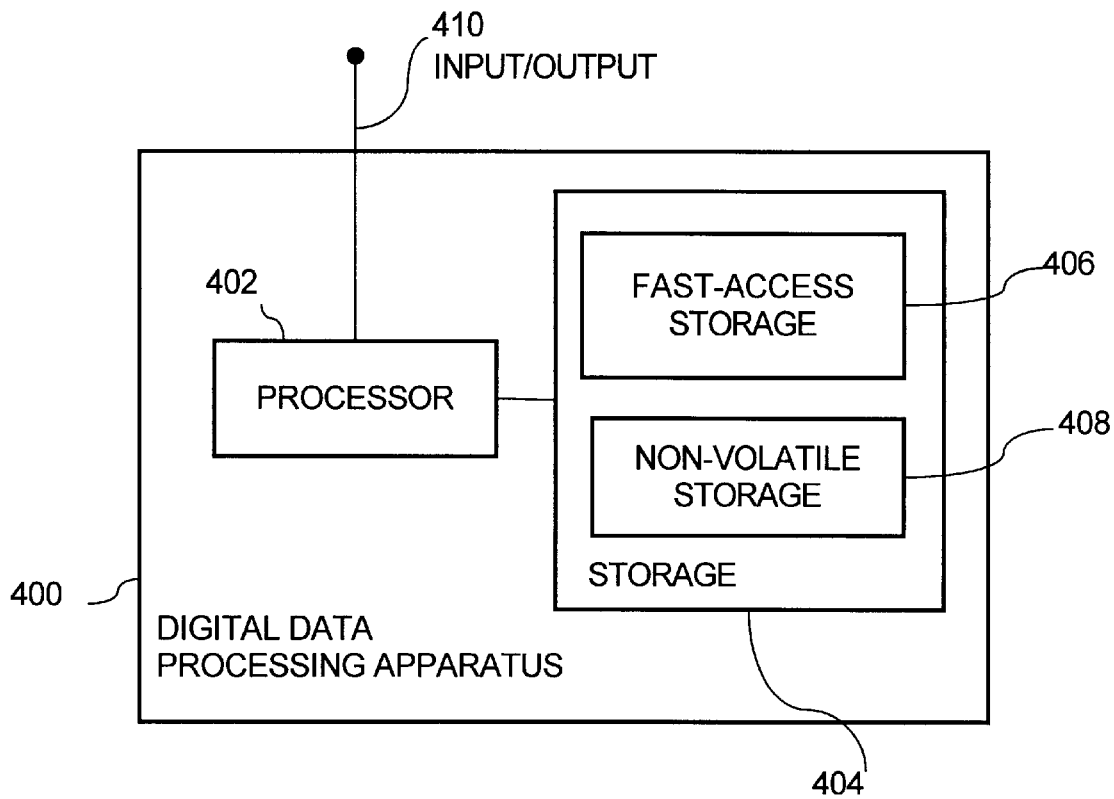
FIG. 4A is a block diagram of a digital data processing machine according to the invention.
Figure 4B:
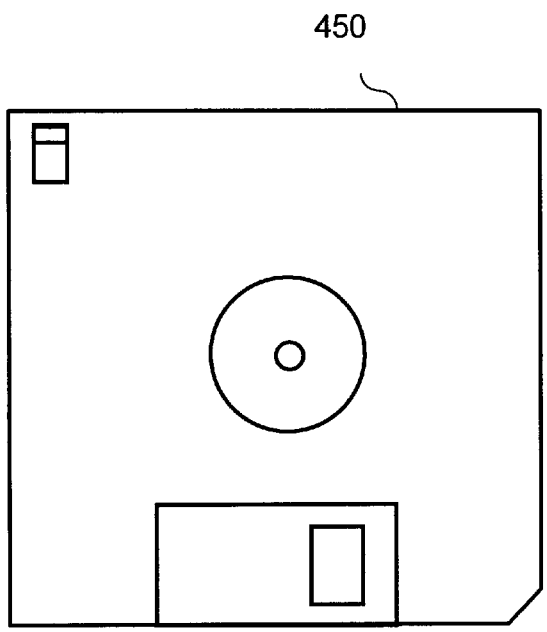
FIG. 4B shows an exemplary signal-bearing medium according to the invention.

Another aspect of the invention concerns a digital data processing apparatus, which may be used to implement the controller 120. This apparatus may be embodied by various hardware components and interconnections; one example is the digital data processing apparatus 400 of FIG. 4A. The apparatus 400 includes a processor 402, such as a microprocessor, digital signal processor, or other processing machine, coupled to a storage 404. In the present example, the storage 404 includes a fast-access storage 406, as well as nonvolatile storage 408. The fast-access storage 406 may comprise random access memory ("RAM"), and may be used to store the programming instructions executed by the processor 402. The nonvolatile storage 408 may comprise, for example, one or more nonvolatile data storage devices such as a magnetic "hard drive", a tape drive, or any other suitable storage device. The apparatus 400 also includes an input/output 410, such as a line, bus, cable, electromagnetic link, or other means for the processor 402 to exchange data with other hardware external to the apparatus 400.

Despite the specific foregoing description, ordinarily skilled artisans (having the benefit of this disclosure) will recognize that the apparatus discussed above may be implemented in a machine of different construction, without departing from the scope of the invention. As a specific example, one of the components 406, 408 may be eliminated; furthermore, the storage 404 may be provided on-board the processor 402, or even provided externally to the apparatus 400.

As another example, the apparatus 400 may be formed of a semiconductor chip where all processing and data storage components are partitioned into various parts within a single memory device, such as a central processing unit.

Logic Circuitry

In contrast to the digital data storage apparatus discussed previously, a different embodiment of the invention uses logic circuitry instead of computer-executed instructions. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, biCMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), electrically programmable logic device ("EPLD"), programmable logic array ("PLA"), and the like.

Operation

In addition to the various hardware embodiments described above, a different aspect of the invention concerns a method for providing electrical power to customers on a prepaid basis.

Signal-Bearing Media

In the context of FIGS. 1–4A, such a method may be implemented, for example, by operating the controller 120, as embodied by a digital data processing apparatus 400, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to provide electrical power to customers on a prepaid basis.

This signal-bearing media may comprise, for example, RAM (not shown) included in the controller 120, as represented by the fast-access storage 406. Alternatively, the instructions may be contained in another signal-bearing media, such as a magnetic data storage diskette 450 (FIG. 4B), directly or indirectly accessible by the processor 402. Whether contained in the storage 406, diskette 450, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic memory (e.g., ROM, flash memory, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the controller 120, and is configured to perform operations to implement the method of the invention. The logic circuitry may be implemented using many different types of circuitry, as discussed above.

Operational Sequences

FIGS. 5–8 show various exemplary operating sequences to illustrate the method aspects of the invention in greater detail. For ease of explanation, but without any intended limitation, the examples of FIGS. 5–8 are described in the context of the specific apparatus 106 described above (FIGS. 1–3).

The sequence 500 (FIG. 5) provides an overall view of the process for establishing and then providing prepaid power service. The sequence 600 (FIG. 6) shows an exemplary process for operating the prepaid power metering apparatus 106. The sequence 700 (FIG. 7) illustrates customer prepayment by local use of a payment card. The sequence 800 (FIG. 8) illustrates customer prepayment by contacting the power interagent and providing appropriate payment authorization.

Establishing/Providing Power

Figure 5:
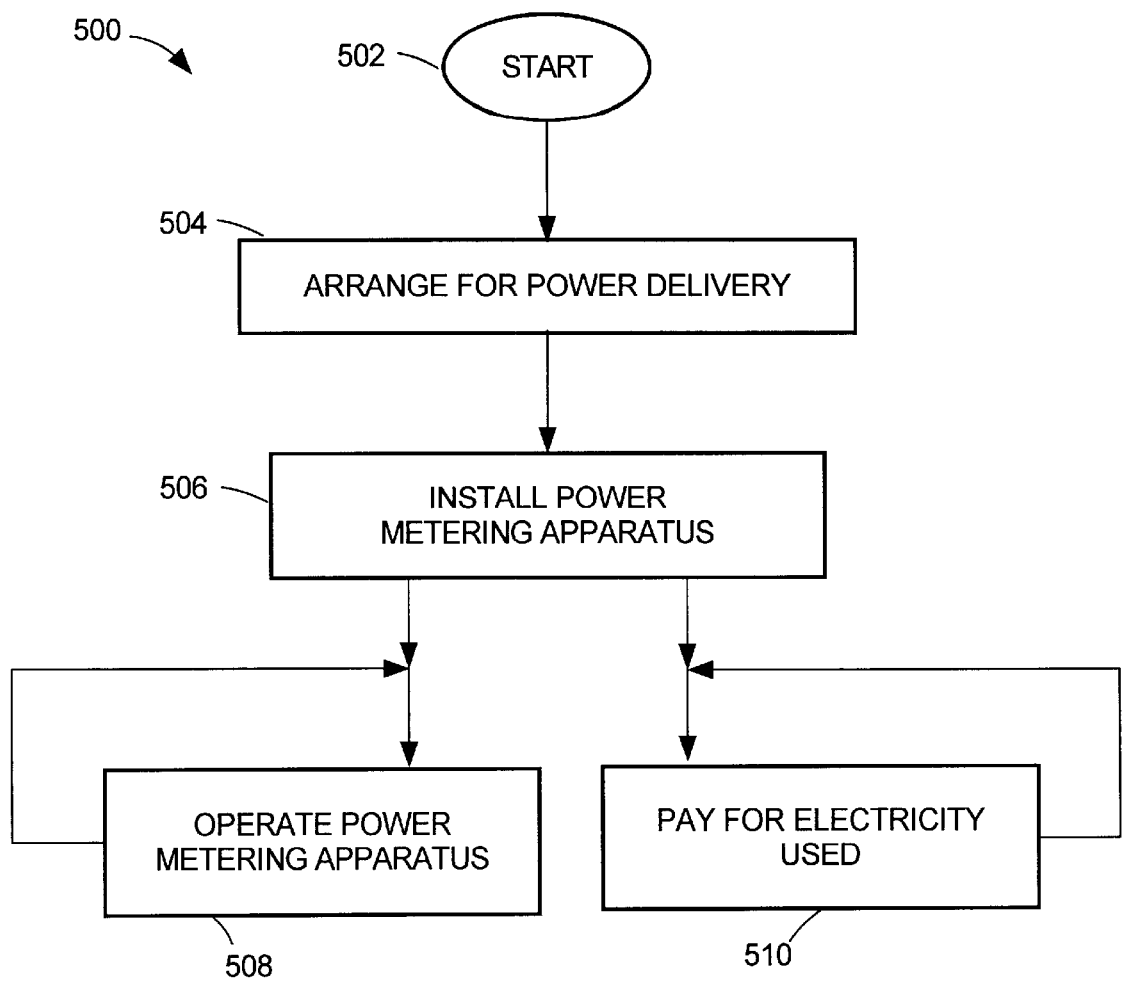
FIG. 5 is a flowchart of a sequence for establishing and then providing prepaid power service.

As mentioned above, the sequence 500 (FIG. 5) provides an overall view of the process for establishing and then providing prepaid power service. Referring to FIG. 5, the sequence 500 begins in step 502. In step 504, agents of the power interagent arrange for delivery of electricity to the customer's electrical facility 109. Although the details of this step may vary according to the regulatory climate and effective laws, one embodiment involves the power interagent contracting with the electricity distribution company for power service. In a deregulated power market, the power interagent may request power generated by an electricity service provider other than the electricity distribution company.

As still another possibility, the power interagent may purchase power from a power generator that "wheels" power to the customer's electrical facility. By "wheeling" power, the power interagent can purchase power at a substantial discount, and pass significant savings to the customer. These savings can be shared with customers to make the power metering apparatus 106 more desirable for those customers, while enhancing profit for the power interagent. For ease of reference, the term "electricity supplier" is utilized to include the possibilities of electricity distribution company, electricity service provider, source of "wheeled" power, unified power commission, or any other source of electrical power.

Whether it obtains wheeled power or not, the power interagent may also achieve discounted electrical power by entering into long-term contracts with electricity suppliers. Advantageously, the power metering apparatus 106 enables the power interagent to assume long term responsibility for payment of power consumed by the facility 109 regardless of changes in the customer from time to time, fluctuations in power usage, and other variables.

The arrangement of step 504 may be implemented in many different ways. Some examples include establishing an open account, pre-authorizing periodic billing, posting a deposit or other acceptable form of security with the electricity supplier. After making this advance arrangement with the electricity supplier, the power interagent proceeds to pay the electricity supplier for power that is consumed at the customer's electrical facility, as measured by the power company meter 104.

After step 504, the power interagent installs the power metering apparatus 106 at the customer's electrical facility 109. Namely, the apparatus 106 is electrically inserted between the power company meter 104 and the customer's breaker box 108. If desired, the apparatus 106 may be placed at another location upstream of the customer's facility 109, such as between the breaker box 108 and the customer's electrical facility 109. The apparatus 106 may also operate between the power source 102 and the power company meter 104, although these electrical lines are typically owned by the electricity distribution company and not amenable to modification.

Also in step 506, the telephone line connector 206 is attached to the customer's telephone line. Alternatively, or in addition, the cable line connector 208 may be attached to the customer's cable connection. If desired, the local wireless link 210 may be installed by connecting it to telephone and/or cable lines. After the apparatus 106 is installed as described above, the apparatus 106 is powered-up and one or more diagnostic tests are run using the interface 126. When the apparatus 106 is operating properly, installation is complete.

Figure 6:
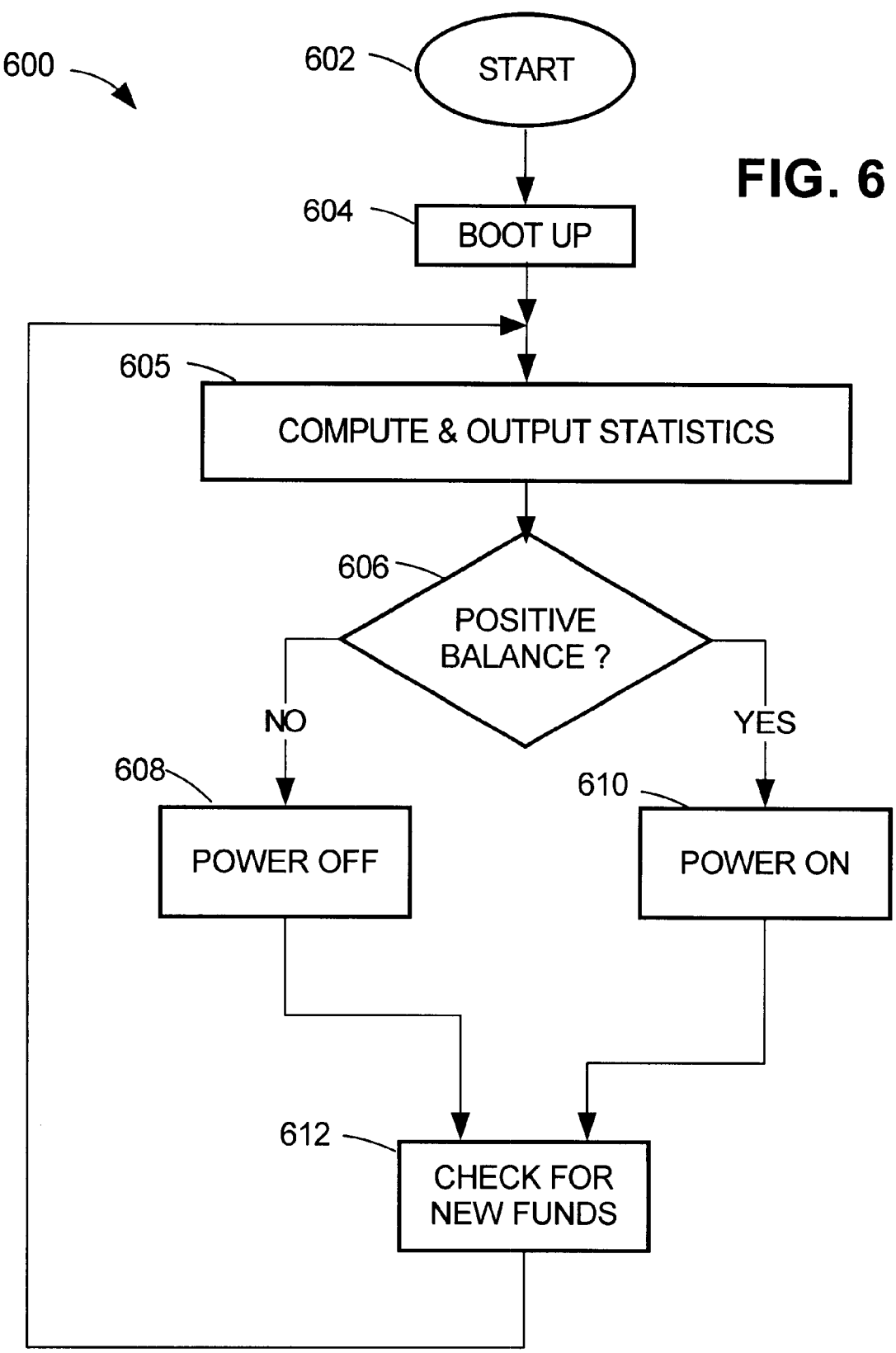
FIG. 6 is a flowchart of a sequence for operating the prepaid power metering apparatus of the invention.
Figure 7:
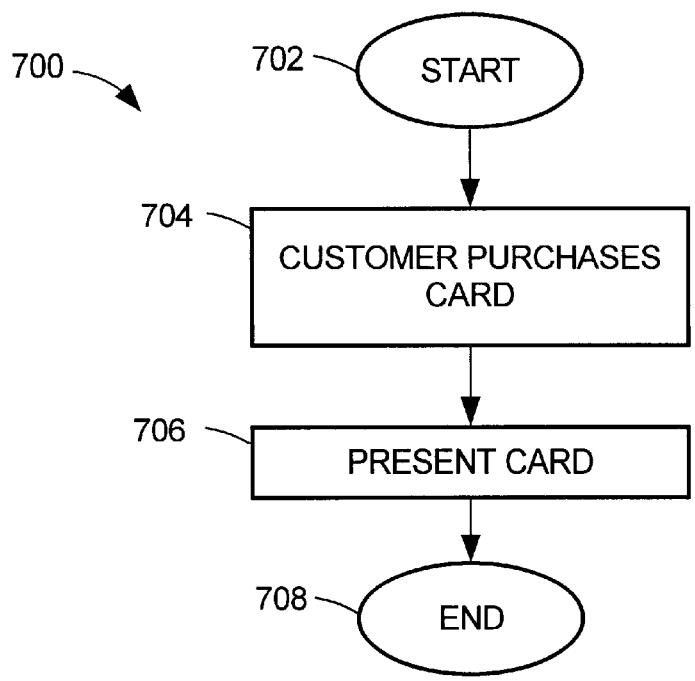
FIG. 7 is a flowchart of an operational sequence for customer prepayment by local use of or payment card according to the invention.
Figure 8:
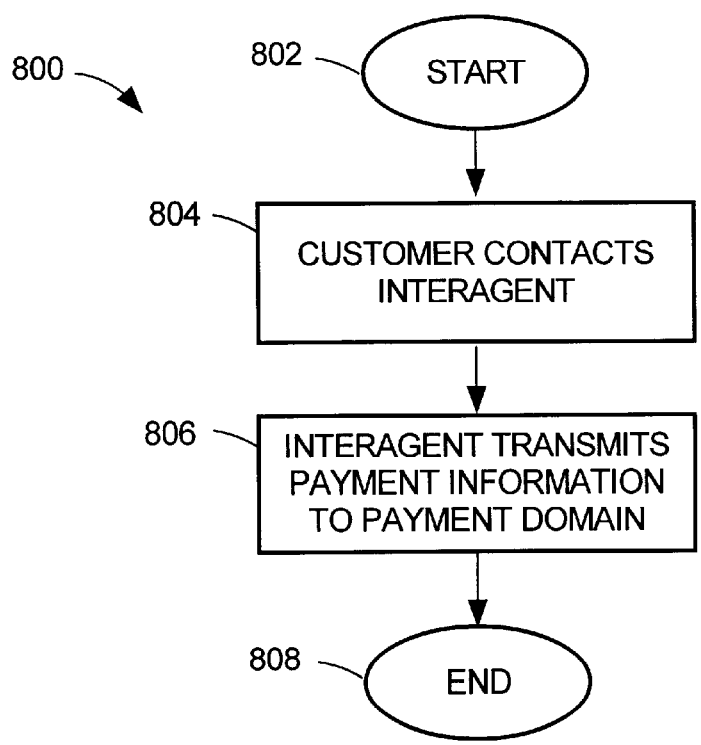
FIG. 8 is a flowchart of an operational sequence for customer prepayment by contacting the prepaid power interagent, according to the invention.

After step 506, the power metering apparatus 106 in step 508 operates according to the sequence described below (FIG. 6). Simultaneously, the customer prepays for electrical service in step 510, as described in greater detail below (FIGS. 7–8).

Operation of Power Metering Apparatus

As mentioned above, the sequence 600 (FIG. 6) shows an exemplary process for operating the prepaid power metering apparatus 106. Referring to FIG. 6, the sequence 600 begins in step 602. In step 604, the prepaid power metering apparatus 106 boots up. This may occur, for example, when the apparatus 106 is initially "turned on," or when the apparatus 106 is re-booted using the diagnostic interface 126. Boot-up may involve a number of system integrity checks, for example. In step 605, the controller 120 computes and outputs appropriate statistics to the user information domain 124. In the illustrated example, the controller 120 makes the following computations:

1. The amount of power used by the customer for display by the power-used 302 component. In the present example, the power usage is computed from the customer's very first use of the power metering apparatus 106, although other appropriate times may be used as a beginning point for this computation.
2. The customer's remaining power balance. This is the amount of power that has been "prepaid," through advance payment or sufficient payment-assurances. The power balance may be expressed in units of time (such as kilowatt-hours of power or hours of cable television) or volumetrically (such as kilowatts of electricity, gallons of water, cubic feet of natural gas, etc.).
3. The customer's average rate of power usage. This is computed by dividing the power-used by the time period over which the power usage has been computed. The average rate of power usage may be provided in kilowatts per hour or other appropriate units, for example.
4. The estimated time-remaining before power is turned off. This is calculated by dividing the customer's remaining power balance by the customer's average rate of power usage.
5. Whether there has been occurrence of any determined events associated with purchase events, continuous operation notifications, or near term termination possibilities such as twenty-four, twelve, six, three, one, or zero hours before power outage.

Also in step 605, the controller 120 outputs the statistics, where appropriate, to the user information domain 124. For example, the controller 120 provides the amount of power used to the display 302, and the time-remaining to the display 304. Additionally in step 605, the controller 120 may employ the communication components of the payment domain 122, normally used to receive external payment notification from the power interagent, to transmit various statistics back to the power interagent. For example, step 605 may transmit some or all of the recently computed output statistics, historical power use information, data concerning the customer's payment for power by local payment card, etc. If the power interagent thereby learns that the customer's power use meets certain criteria, such as impending power outage, the power interagent may transmit an appropriate message to the controller 120 via the components of the payment domain 122, for ultimate display at the user information domain 124.

After step 605, the controller 120 asks whether the customer has made sufficient payments, i.e. payments sufficient to keep the power flowing (step 606). In particular, the controller 120 determines whether there is a positive balance. In the illustrated example, this information is available from the computations performed in step 605. If the customer does not have a positive balance, the controller 120 in step 608 commands the switch 14 to turn off (or remain off). In this case, the apparatus 106 does not supply any power to the customer's electrical facility 109 (step 608). On the other hand, if step 606 finds that the customer has a positive balance, the controller 120 in step 610 instructs the switch 114 to turn on (or remain on).

After step 608 or 610, the controller 120 checks for the receipt of new or additional prepayment funds (step 612). This is done by consulting the card reader 202 and telecommunications interface 204. Alternatively, step 612 may be performed on a hardware interrupt basis, where the card reader 202 and/or telecommunications interface 204 issue a hardware interrupt to the controller 120 whenever new funds are received; in this case, step 612 is omitted.

After step 612, or steps 608/610 if step 612 is omitted, the controller 120 returns to step 605, where it re-computes and re-outputs the statistics mentioned above. Even in the absence of any new funds, step 605 is still useful because the customer's ongoing power usage changes the power-used and time-remaining statistics. After step 605, the routine 600 continues as discussed above.

Prepayment by Local Payment Card

Referring to FIG. 7, the sequence 700 illustrates customer payment by using a prepayment card. The sequence starts in step 702. In step 704, the customer purchases a prepayment card. In one example, this card comprises a plastic, paper, or other card-of convenient size, which bears a magnetic stripe. The magnetic stripe contains machine-readable prepayment information, which comprises an amount of "e-power" (specified in kilowatts or another convenient unit), or an amount of "e-funds" (specified by a dollar amount of the prepurchase). Some alternate embodiments of the prepayment card include optical cards and circuit-equipped "smart" cards.

To ensure convenient availability of power to customers, prepayment cards may be sold at convenience stores, grocery stores, banks, retail stores, or other prepayment outlets. Such outlets initially receive such cards from the power interagent. The cards may be supplied to the prepayment outlets in designated denominations (such as 100, 500, 1,000, and 10,000 kilowatts). Alternatively, the retail outlets may be provided with card programming machinery to individually configure cards with the appropriate prepayment indicia at the time of purchase. The data stored by the prepayment card may be encrypted to reduce the likelihood of customer tampering.

After purchasing the card in step 704, the customer returns to the customer's home, business, or other site of the electrical facility 109. In step 706, the customer locally presents the card to the card reader 202. With a magnetic card, step 706 may be achieved by swiping the card through a card-reading slot, waving the card past a panel, inserting the card into an ATM-style slot, etc. Step 706 may alternatively be performed by running the card past an optical reader, or various other techniques depending upon the type of card and reader.

Responsive to the customer presenting the prepayment card to the card reader 202, the controller 120 verifies the card. In one embodiment, each card may have a "one time" read-and-recognize component, and thereafter the card may be (1) discarded, or alternatively (2) returned to a place of purchase for the emplacement of additional power purchase coding. The controller 120 may verify the card by many different techniques, such as analyzing a security code contained on the card to determine whether the code exhibits predetermined, internal, mathematical or logical qualities.

The controller 120 may deduct power from the card in various different ways. For example, the controller 120 may permit the customer to have all power represented on the card immediately deducted (and the card deactivated), or alternatively have power deducted from the card only as long as it is left in the card reader 202. As one example, the card may be zeroed out if the user inserts then immediately removes the card from the card reader 202. On the other hand, the card may be decremented according to real time power usage if the customer chooses to leave the card in the reader 202.

After step 706, the routine 700 ends in step 708.

Payment & Notification Via Power Interagent

Referring to FIG. 8, the sequence 800 illustrates a different type of customer payment, which occurs when the customer contacts the power interagent and provides appropriate prepayment or payment assurances. The sequence 800 begins in step 802. In step 804, the customer contacts the power interagent and provides advance payment or sufficiently reliably payment assurances. For ease of reference, this is referred to as "prepayment". For the customer's convenience, the customer may perform step 804 in many different ways. For instance, the customer may use one of the following options:

1. Contacting the power interagent via telephone and providing a credit card number to a telephone operator or automated system for the purpose of charging of a fixed amount. If desired, the power interagent may offer a toll-free telephone number for this purpose.
2. Logging into a secure, self-guided internet worldwide web site maintained by the power interagent to accept prepayment by credit card, ATM debit card, etc.
3. Submitting bank or credit card prepayment authorization by e-mail.
4. Submitting "cash" in the form of wire transfer, personal check, cashier's check, currency, or money order to the power interagent in person, or through mail delivery including U.S. Postal Service, express delivery company, courier, etc.
5. Providing payment in person, at an office of the power interagent.
6. Instructing the power interagent to initiate a new credit card in the customer's name. Depending upon the customer's desires, telephone operators of the power interagent may obtain the customer's financial history over the telephone and provide the customer with a credit card. Depending upon the customer's credit history, this process may occur substantially instantaneously, where the power interagent activates the credit card over the telephone and enters the electrical power prepayment as the credit card's very first purchase.
6. Contracting with the power interagent to refinance the customer's loan owed on the electrical facility 109. The refinancing would occur at a slightly higher percentage rate than the existing mortgage, affording the power interagent some profit. In exchange, the power interagent provides the customer with some amount of electricity. For example, the power interagent may provide (1) an unlimited amount of electricity, (2) a fixed amount of electricity with credit being provided for any under-use or over-use, (3) no-charge electricity up to a fixed amount, or (4) another arrangement. The customer also benefits because from this arrangement for a number of reasons. First, since the customer actually consumes less electricity due to the power saver 112, and may enjoy additional savings due to the power interagent's power wheeling, the power interagent may only need to increase the customer's mortgage rate by a small amount from what the customer is already paying. Furthermore, as part of the customer's new mortgage, this amount may be tax deductible, whereas the customer's electrical bills would not otherwise be tax deductible.
7. Contracting the power interagent by any means and making suitable payment assurances. For example, authorization may be given for future payment according to the means described above. Also, in the case of reliable, institutional customers with large or many electrical facilities, a promise to pay for power used may be sufficient. In this case, payment is effected by suitable means such as wire transfer, which may be made on an appropriate schedule such as monthly, weekly, or even daily in circumstances of massive power consumption.

After the customer makes prepayment step 804, the power interagent transmits notification of the customer's prepayment to the prepaid power metering apparatus 106 (step 806). In the illustrated embodiment, this notification includes the number of kilowatts purchased by the customer. Alternatively, or in addition, the prepayment information may include the dollar amount of the purchase. If dollars are used and the amount of power is omitted, the notification may also includes an applicable power rate in appropriate units such as dollars per kilowatt.

The notification of step 806 is transmitted via telephone line 206, cable connection 208, or other link to the apparatus 106 provided at the customer's electrical facility 109. After step 806, the routine 800 ends in step 808.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of doing business, comprising the following operations:

a utility interagent interposing a metering apparatus between a utility company's delivery line and a customer's utility consuming facility, the apparatus selectively enabling delivery of utility services from the utility company to the customer's facility;

the interagent assuming financial responsibility for utility services delivered to the customer's facility, and paying for delivered utility services as measured by the utility company; and the metering apparatus automatically enabling delivery of utility services to the customer's facility only when the customer has made payment assurances of prescribed character to the interagent.

2. The method of claim 1, the utility services comprising electric power and operations further comprising:

the power interagent arranging for wheeling of electric power to an electric power company that operates the delivery line.

3. The method of claim 1, the operations further comprising:

the metering apparatus accepting customer submission of machine-readable indicia of the payment assurances.

4. The method of claim 1, the metering apparatus maintaining a balance of payment assurances and the operation of automatically enabling the delivery of utility services comprising:

enabling the delivery of utility services only when there is a positive balance of payment assurances.

5. The method of claim 4, the operations further comprising reducing the balance of payment assurances in accordance with delivery of utility services to the customer's facility.

6. The method of claim 1, the operations further comprising the interagent receiving payment assurances from the customer for delivery of utility services to the customer's facility.

7. The method of claim 2, the operation of receiving payment assurances comprising at least one of the following operations:

charging funds to a credit card of the customer;

debiting funds from a bank account of the customer;

receiving cash from the customer;

refinancing real property of the customer at an interest rate that incorporates payment for utility services;

obtaining the customer's agreement to make payment to the interagent.

8. The method of claim 6, the operations further comprising:

the power interagent transmitting machine-readable notification of the received payment assurances to the metering apparatus.

9. The method of claim 6, the payment assurances being received via at least one of the following:

in person, postal service, internet web site, e-mail, wire transfer, automated teller machine, telephone, wireless link.

10. A method for operating a third party utility service metering apparatus including a switch interposed between a utility company's delivery line and a customer's utility consuming facility, a local meter, at least one input device to receive signals remotely transmitted by a third party, and a controller coupled to the switch and the local meter and the input device, the method comprising operations of:

the input device receiving the third party's remotely transmitted notifications of the customer having made payment assurances of a prescribed character to the third party, and forwarding each said notification to the controller;

the controller recalculating a utility service balance to reflect each said notification;

the local meter measuring delivery of utilities to the customer's facility, and the controller reducing the utility service balance in accordance therewith; and the controller configuring the switch to enable delivery of utility services to the customer's facility whenever there is a positive utility service balance, otherwise configuring the switch to disable delivery of utility services.

11. The method of claim 10, where each notification includes an amount of utility services for which payment assurances have been made.

12. The method of claim 10, where:

each notification includes a monetary amount for which payment assurances have been made; and the operations further include the utility service metering apparatus receiving a utility service rate.

13. The method of claim 10, where:

the utility services comprise electrical power;

the utility service metering apparatus additionally includes a power conserving device; and the operations further include the power conserving device conditioning electricity delivered by the utility service metering apparatus to reduce power consumption at the customer's facility.

14. A signal-bearing medium tangibly embodying a program of machine-readable instructions executable by a digital processing apparatus to perform a method for operating a third party utility service metering apparatus including a switch interposed between a utility company delivery line and a customer's utility consuming facility, a local meter, at least one input device to receive remotely transmitted signals by a third party, and a controller coupled to the switch and the local meter and the input device, the method comprising operations of:

the input device receiving the third party's remotely transmitted notifications of the customer having made payment assurances of a prescribed character to the third party, and forwarding each said notification to the controller;

the controller recalculating a utility service balance to reflect each said notification;

the local meter measuring delivery of utilities to the customer's facility, and the controller reducing the utility service balance in accordance therewith; and the controller configuring the switch to enable delivery of utility services to the customer's facility whenever there is a positive utility service balance, otherwise configuring the switch to disable delivery of utility services.

15. A logic circuit of multiple interconnected electrically conductive elements configured to perform a method for operating a third party utility service metering apparatus including a switch interposed between a utility company delivery line and a customer's utility consuming facility, a local meter, at least one input device to receive signals remotely transmitted by a third party, and a controller coupled to the switch and the local meter and input device, and input device, the method comprising operations of:

the input device receiving the third party's remotely transmitted notifications of the customer having made payment assurances of a prescribed character to the third party, and forwarding each said notification to the controller;

the controller recalculating a utility service balance to reflect each said notification;

the local meter measuring delivery of utilities to the customer's facility, and the controller reducing the utility service balance in accordance therewith; and the controller configuring the switch to enable delivery of utility services to the customer's facility whenever there is a positive utility service balance, otherwise configuring the switch to disable delivery of utility services.

16. A third party utility service metering apparatus, comprising:

a utility service delivery path interposed between a utility company delivery line and a customer's utility consuming facility, the path including a switch and a local meter to measure delivery of utilities to the customer's facility;

at least one input device to receive remotely transmitted signals; and a controller coupled to the switch, the local meter, and the input device, the controller being programmed to configure the switch by performing operations comprising:

receiving via the input device remotely transmitted notification of the customer having made payment assurances of a prescribed character to the third party;

recalculating a utility service balance to reflect each said notification;

reducing the utility service balance in proportion to the delivery of utility services as measured by the local meter; and configuring the switch to enable delivery of utility services whenever there is a positive utility service balance, otherwise configuring the switch to disable delivery of utility services.

17. The apparatus of claim 16 the input device including at least one of the following:

a cable modem, a telephone modem, a wireless communications link.

18. The apparatus of claim 16, further comprising:

a local card reader, coupled to the controller, to receive the customer's submission of a payment card bearing machine-readable notification of customer prepayment for utility services.

19. The apparatus of claim 16, where:

the utility services comprise electrical power;

the apparatus further comprises a power conserving device.

20. The apparatus of claim 16, further comprising a mode switch alternatively configurable by user input into settings comprising:

a METERING-ENABLED setting routing utility services through the utility service delivery path;

a SHUNT setting routing utility services from the utility company meter to the customer's facility bypassing the utility service delivery path.

21. The apparatus of claim 16, the mode switch being additionally configurable by user input into an OFF setting preventing delivery of utility service to the customer.

22. A third party utility service metering apparatus, comprising:

a utility service delivery path interposed between a utility company delivery line and a customer's utility consuming facility, the path including a switching means and a means for measuring delivery of utility services to the customer's facility;

input means for receiving remotely transmitted signals; and controller means, coupled to the switching means, means for measuring delivery, and input means, for configuring the switching means by performing operations comprising:

receiving via the input means remotely transmitted notification of the customer having made payment assurances of a prescribed character to the third party;

recalculating a utility service balance to reflect each said notification;

reducing the utility service balance in proportion to delivery of utilities to the customer's facility as measured by the means for measuring delivery;

configuring the switching means to enable delivery of utility services whenever there is a positive utility service balance, otherwise configuring the switching means to disable delivery of utility services.

\* \* \* \* \*